Patented Feb. 21, 1950

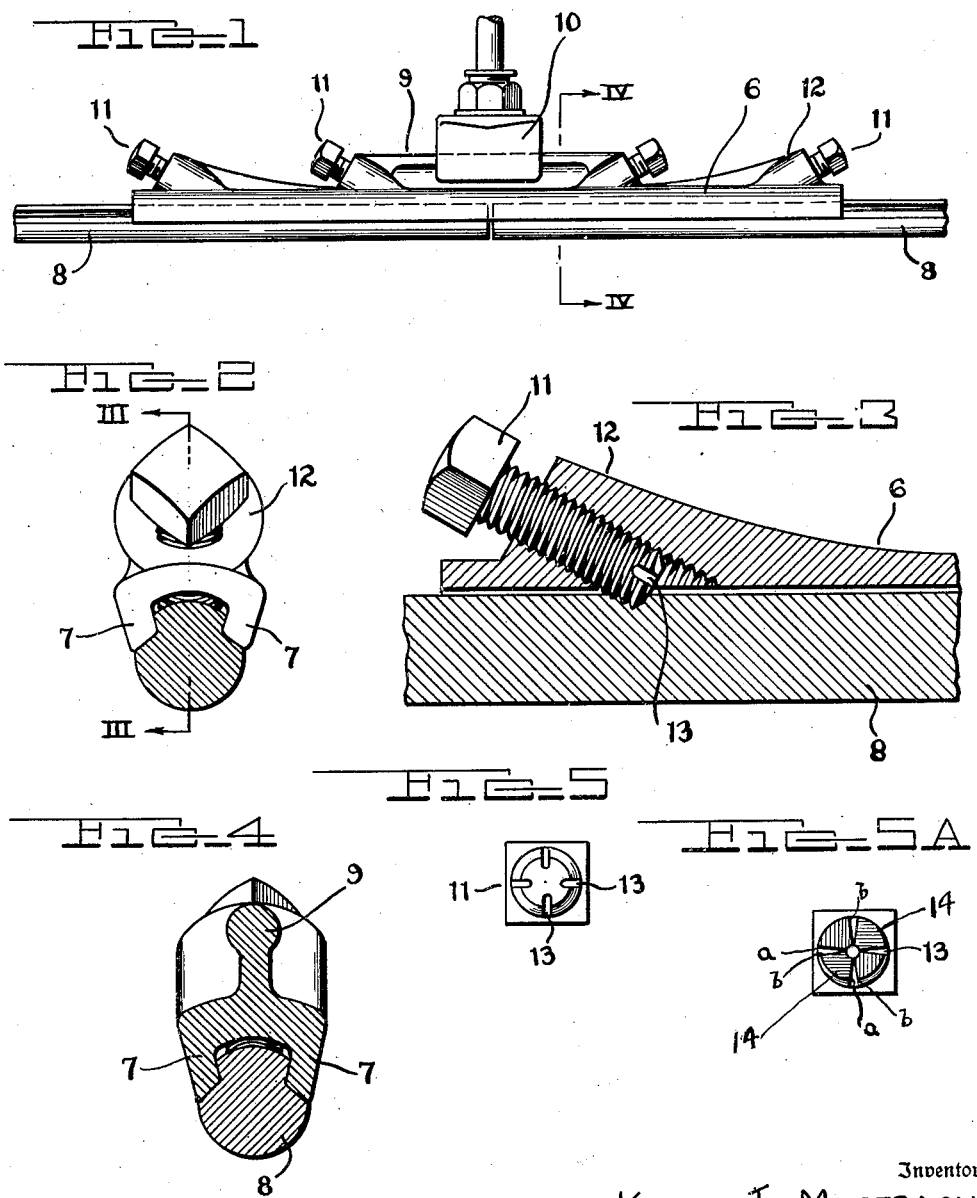

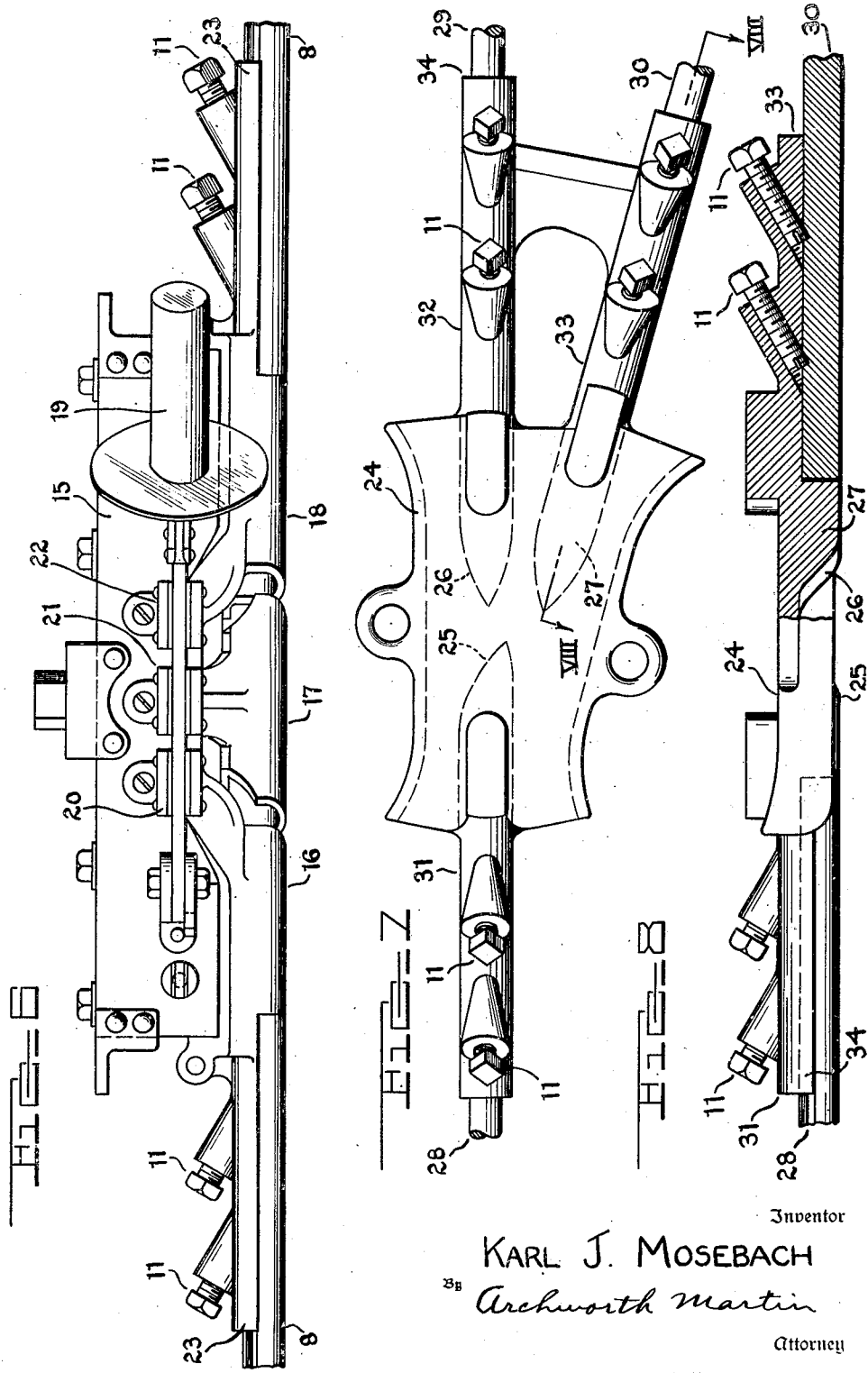

2,498,568

UNITED STATES PATENT OFFICE 2,498,568

TROLLEY WIRE CONNECTOR

Karl J. Mosebach, Pittsburgh, Pa.; Mary E. Mosebach or Marie E. Mosebach administratrix of the estate of said Mosebach, deceased Application May 9, 1947, Serial No. 746,974

1 Claim. (Cl. 191—44.1)

My invention relates more particularly to trolley wire supports, connectors, and splicers of the type used in conjunction with trolley wires having longitudinal grooves in their sides for supporting the wires in approximately end-to-end relation or otherwise.

In structures of this type used in connecting two wires, the splicer bar usually is of generally channel form in its under portion with the edges of the channel deflected inwardly to form lips that fit into the grooves in the sides of trolley wires. It is desirable in connectors of this type to provide means for rigidly anchoring or connecting the wire ends to the splicer bar, in such manner that the ends of the connected wires are in relatively-rectilinear alinement.

My invention has for one of its objects the provision of means for firmly holding wires in splicer bars and the like, without the exertion of vertical thrusts to such a degree as will cause the wires to be displaced from the said wire-supporting lips of a splicer bar.

Another object of my invention is to provide anchoring screws and a splicer bar or the like, so arranged that a plurality of the thread turns of each screw will bite into the uppermost surface of the trolley wires, along lines generally transverse to the wires, to thereby provide a plurality of holding surfaces at each screw that will resist tensional forces which tend to pull the wires from the splicer bar in longitudinal directions.

In the accompanying drawings, Figure 1 shows my improved connector in its operative relation to adjacent ends of trolley wires; Fig. 2 is an enlarged end view of the connector; Fig. 3 is a view taken on the line III—III of Fig. 2; Fig. 4 is an enlarged view taken on the line IV—IV of Fig. 1; Fig. 5 is an end view of one of the anchoring screws of Fig. 1; Fig. 5A shows a screw 11 with its end faces formed to more effectively cut into a trolley wire; Fig. 6 is a side view of a section switch that contains an embodiment of my invention; Fig. 7 is a plan view of a trolley frog of a form suitable for use with my improved wire-anchoring means, and Fig. 8 is a view taken on the line VIII—VIII of Fig. 7.

The structure comprises a splicer bar portion 6 of generally channel form in its lower face, with its flanges 7 bent inwardly to form lips as shown more clearly in Fig. 2, to engage grooves in the sides of the trolley wires 8, the wire ends being placed in the bar by sliding them into it in longitudinal directions.

The bar 6 has a rib 9 on its upper side that serves as a convenient means for attachment to a hanger clamp 10 which may be of a conventional form.

Anchoring screws 11 are provided for the wires, the screws all being of identical form and having engagement with threaded openings that extend through bosses 12 of the splicer bar. The screws are here shown as inclined at about 30° to the trolley wires, although this angularity can be varied. Each screw has notches 13 cut in its inner end so that the threads which are broken or interrupted by such notches will be thereby given cutting edges that will enable them to cut helical grooves in the wire with which they have engagement. These notches will not be needed where the wires are of the softer grades.

With the wires in place in the splicer bar, the screws 11 are turned and thereby advanced into the bosses 12 until their inner threads cut into the upper surfaces of the trolley wires. Such turning movement is continued until perhaps three or four thread turns of each screw have cut their way into the wires, it being understood that the wires usually are of softer metal than the screws. While this results in some vertical component of thrust on the wires, such thrusting force is small compared to the longitudinal component of force that is exerted by the sides of the threads. There are thus, in effect, perhaps four shoulders cut into the wires by each screw, all of these shoulders serving to resist longitudinal forces that tend to pull the wires from the bar.

The slots 13 are so positioned relative to the sides of the screw head that when the screw has been turned into holding position, with one corner of its head uppermost, there will be no slot 13 opposite to the wire 8, and therefore, the screw threads will have effective engagement with the adjacent surface of the wire.

In Fig. 5A, I show how the inner ends of the screws may be formed so that they may more effectively cut into the trolley wires. The lands 14, between the grooves 13 are beveled from *a* to *b*, after the manner of a drill bit, the corners *a* being higher than the corners *b*, and therefore serving as the leading or cutting edge when the screw is being turned into biting engagement with a trolley wire.

In Fig. 6, I show a manner in which my invention may be incorporated in a section switch 15 that may be of any suitable conventional form, except for those conductor bars which have direct mechanical connection with the trolley wires 8. The switch has the usual conductor bars 16, 17 and 18, whose lower portions, in effect, serve as continuations of the wires 8 when the switch 19 is closed to complete the circuit between the switch jaws 20, 21 and 22 respectively, of the conductor bars. In this structure, the conductor bars 16 and 18 have inclined threaded holes therein for the screws 11 and have inturned lips 23 at their outer ends, for gripping the trolley wires 8, as in the case of the lips 7 of Fig. 2, the screws 11 serving to hold the wires against longitudinal displacement and in end-to-end relation with the conductor bars 16 and 18.

Referring now to Figs. 7 and 8, I show a frog for trolley wheels having the usual pan portion 24 and ribs 25, 26 and 27 pointing toward the central area at the under surface of the pan to serve as track rails for trolley wheels, in the usual manner. However, these ribs are of shorter length than conventional ribs, since trolley wires 28, 29 and 30 are connected thereto in end-to-end relation and extend into the area below the pan 24.

Extensions 31, 32 and 33 of generally channel shape are formed on the pan to receive the trolley wires 28, 29 and 30 respectively, these extensions of the pan having inturned lips 34 for gripping the trolley wires, as in the case of the lips 7 of Fig. 2, the screws 11 also, of course, serving to hold the trolley wires against displacement longitudinally.

I claim as my invention:

A connector for trolley wires that have longitudinal grooves in their sides and are positioned in relatively longitudinally-spaced relation, comprising a section switch having three longitudinally-spaced conductor bars, a switch for making and breaking electrical connection between said bars, the intermediate bar and adjacent portions of the other bars having their lowermost surfaces in longitudinal alinement for engagement by a traveling current collector, and the more remote end portions of the said other bars being of reduced vertical dimension and having downwardly and inwardly extending lips for engagement with the grooves in the sides of trolley wires and adapted to support the wires with their lowermost surfaces in longitudinal alinement with the said lowermost faces of the said bars, and screws rotatably mounted in the endmost bars and sloping toward the intermediate bar, in the same general direction as the bars, but at such angularity that a plurality of the thread turns of each screw are engageable with upper surfaces of the wires, to thrust the wires into endwise engagement with the end bars of the switch.

KARL J. MOSEBACH.

REFERENCES CITED

The following references are of record in the file of this patent:

UNITED STATES PATENTS

| Number | Name | Date |
| --- | --- | --- |
| 1,594,926 | Chandler | Aug. 3, 1926 |
| 1,912,177 | Chandler | May 30, 1933 |
| 1,977,343 | Matthes | Oct. 16, 1934 |
| 2,053,965 | Matthes | Sept. 8, 1936 |
| 2,288,681 | Chandler | July 7, 1942 |

FOREIGN PATENTS

| Number | Country | Date |
| --- | --- | --- |
| 380,996 | Italy | Feb. 19, 1940 |